United States Patent [19]

Cheong

[11] Patent Number: 5,576,620
[45] Date of Patent: Nov. 19, 1996

[54] DEVICE FOR DETECTING MOTOR SPEED OF AUTOMATIC WASHING MACHINE

[75] Inventor: Dal H. Cheong, Seoul, Rep. of Korea

[73] Assignee: Goldstar Co., Ltd., Seoul, Rep. of Korea

[21] Appl. No.: 352,070

[22] Filed: Nov. 30, 1994

[30] Foreign Application Priority Data

Mar. 17, 1994 [KR] Rep. of Korea ............... 5349/1994

[51] Int. Cl.⁶ ................ G01P 3/48; D06F 33/00
[52] U.S. Cl. ............ 324/174; 324/207.25; 324/207.2; 68/12.16
[58] Field of Search .................. 324/173, 174, 324/207.25, 207.2, 261, 262; 68/12.02, 12.16

[56] References Cited

U.S. PATENT DOCUMENTS

| | | | |
|---|---|---|---|
| 4,250,435 | 2/1981 | Alley et al. | 318/138 |
| 4,745,363 | 5/1988 | Carr et al. | 324/174 |
| 4,795,278 | 1/1989 | Hayashi | 324/174 |
| 4,857,814 | 8/1989 | Duncan | 318/281 |
| 5,074,003 | 12/1991 | Manson et al. | 8/159 |
| 5,111,138 | 5/1992 | Kramer | 324/174 |
| 5,166,611 | 11/1992 | Kujawa, Jr. et al. | 324/173 |
| 5,181,398 | 1/1993 | Tanaka et al. | 68/12.06 |
| 5,210,489 | 5/1993 | Petersen | 324/174 |
| 5,293,760 | 3/1994 | Tani et al. | 68/12.02 |

*Primary Examiner*—Sandra L. O'Shea
*Assistant Examiner*—Jay M. Patidar

[57] ABSTRACT

A device for detecting motor speed of an automatic washing machine suitable for controlling the motor speed in accordance with different kinds of laundry and for improving washing effect of the washing machine. The motor speed detecting device includes a motor speed detecting unit interposed between a support plate and a motor unit. The motor speed detecting unit is cased by a detecting unit casing and has a gear type detecting member mounted to the motor shaft, a rectangular base plate interiorly mounted to a side wall of the detecting unit casing, a magnet mounted to the base plate and generating a magnetic line of force and scanning the magnetic line of force on the detecting member, and a Hall effect linear sensor mounted to the magnet and sensing change of density of line of magnetic force.

4 Claims, 4 Drawing Sheets

DEVICE FOR DETECTING MOTOR SPEED OF AUTOMATIC WASHING MACHINE

BACKGROUND OF THE INVENTION

1. Field of the Invention

The present invention relates in general to control system for an automatic washing machine and, more particularly, to a motor speed detecting device for precisely detecting and controlling the motor speed of the washing machine by means of speed detecting means having a Hall effect linear sensor mounted to an end of a motor shaft, thus to effectively wash different kinds of laundry in accordance with different washing modes agreeable to intrinsic characteristics of the different kinds of laundry and to improve washing effect of the washing machine.

2. Description of the Prior Art

With reference to FIG. 1, there is shown a typical washing machine. In the drawing, the reference numeral 20 denotes a washing tub placed in a washer housing 10, which tub 20 will contain therein washing water along with laundry to be washed. Horizontally placed inside the housing 10 under the washing tub 20 is a support plate 30 for supporting the washing tub 20. The edge of the support plate 30 is fixed to the interior surface of the housing 10. A clutch unit 40 which is mounted to the bottom surface of the support plate 30 has a clutch shaft 50. The top section of the clutch shaft 50, which clutch shaft 50 penetrates the clutch unit 40, in turn penetrates a shaft hole 50' of the center of the support plate 30 and extends into the interior of the washing tub 20. In order to agitate the laundry in the washing tub 20 during washing operation, an agitator 60 is coupled to the top end of the clutch shaft 50 in the washing tub 20. Meanwhile, the bottom end of the clutch shaft 50 is provided with a clutch pulley 70.

Mounted to the bottom surface of the support plate 30 beside the clutch unit 40 is a drive motor unit 80 for generating rotating force, which force will be transmitted to the agitator 60 so as to rotate the agitator 60. The top of the motor unit 80 is fixed to the bottom surface of the support plate 30. The motor unit 80 has an output shaft 90, which shaft 90 extends downward from the unit 80 and has a motor pulley 100 at its bottom end. The motor pulley 100 is connected to and cooperates with the clutch pulley 70 by means of a V-belt 110.

The top of the housing 10 is covered with a top cover 120, which cover 120 has a size sufficiently covering the top of the washing tub 20. In order to supply water for the washing tub 20, a water supply unit 130 is provided on the top section of the housing 10. The washing machine further includes a drain unit 140 for draining water from the washing tub 20 after washing operation, which drain unit 140 is provided in a lower side section of the housing 10 and has a predetermined length of drain hose 150.

In washing operation of the above washing machine, the motor unit 80 is applied with electric power and outputs the rotating force through its output shaft 90. The rotating force of the motor 80 in turn is transmitted to the clutch unit 40 by way of the motor pulley 100, the V-belt 110 and the clutch pulley 70 in turn. Upon reception of rotating force of the motor 80, the clutch unit 40 transmits the rotating force to the agitator 60 while alternately changing the direction of the rotating force into clockwise direction and into counterclockwise direction in accordance with a control signal applied from a microcomputer (not shown) of the washing machine. Therefore, the agitator 60 is periodically alternately rotated in opposed directions, thus to agitate the laundry in the washing tub 20 and to promote frictional contact of the laundry with the washing tub 20 as well as with the washing water.

As described above, the washing operation of the typical washing machine is carried out by clutching motion of the clutch unit alternately changing the direction of the rotating force of the motor into clockwise direction and into counterclockwise direction in accordance with control signal from the microcomputer. However, the above washing machine can not effectively control the motor speed, thus to fail in letting the motor speed be agreeable to intrinsic characteristics of different kinds of laundry. Therefore, the washing machine has a problem that it can not achieve desired washing effect when washing a specified laundry which needs to be specifically washed at a controlled motor speed.

SUMMARY OF THE INVENTION

It is, therefore, an object of the present invention to provide a device for detecting motor speed of an automatic washing machine which overcomes the above problems by controlling the motor speed in accordance with different kinds of laundry, thus to improve washing effect of the washing machine.

In order to accomplish the above object, a device for detecting motor speed of an automatic washing machine in accordance with the invention comprises a housing, a washing tub placed in the housing, a support plate horizontally placed under the washing tub in the interior of the housing and supporting the washing tub in the housing, a motor unit exteriorly provided on the bottom surface of the support plate and having a motor shaft and cased by a motor casing, and a motor speed detecting unit interposed between the support plate and the motor unit and detecting rotative speed of the motor unit.

The motor speed detecting unit is cased by a detecting unit casing and has a gear type detecting member mounted to the motor shaft, a rectangular base plate interiorly mounted to a side wall of the detecting unit casing, a magnet mounted to the base plate and generating a magnetic line of force and scanning the magnetic line of force on the detecting member, and a Hall effect linear sensor mounted to the magnet and sensing change of density of line of magnetic force.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
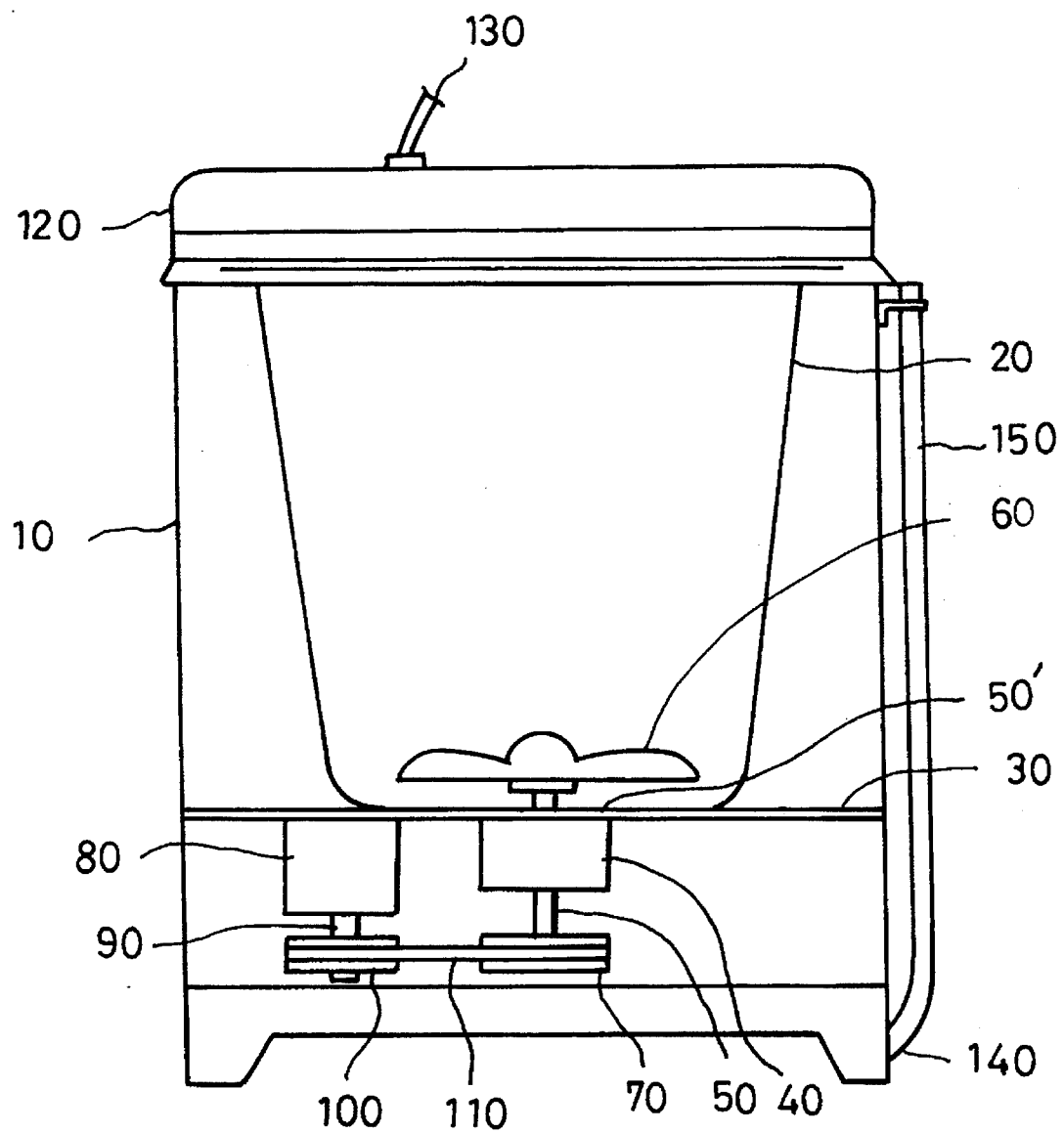
FIG. 1 is a sectional view showing a construction of a typical washing machine.
Figure 2:
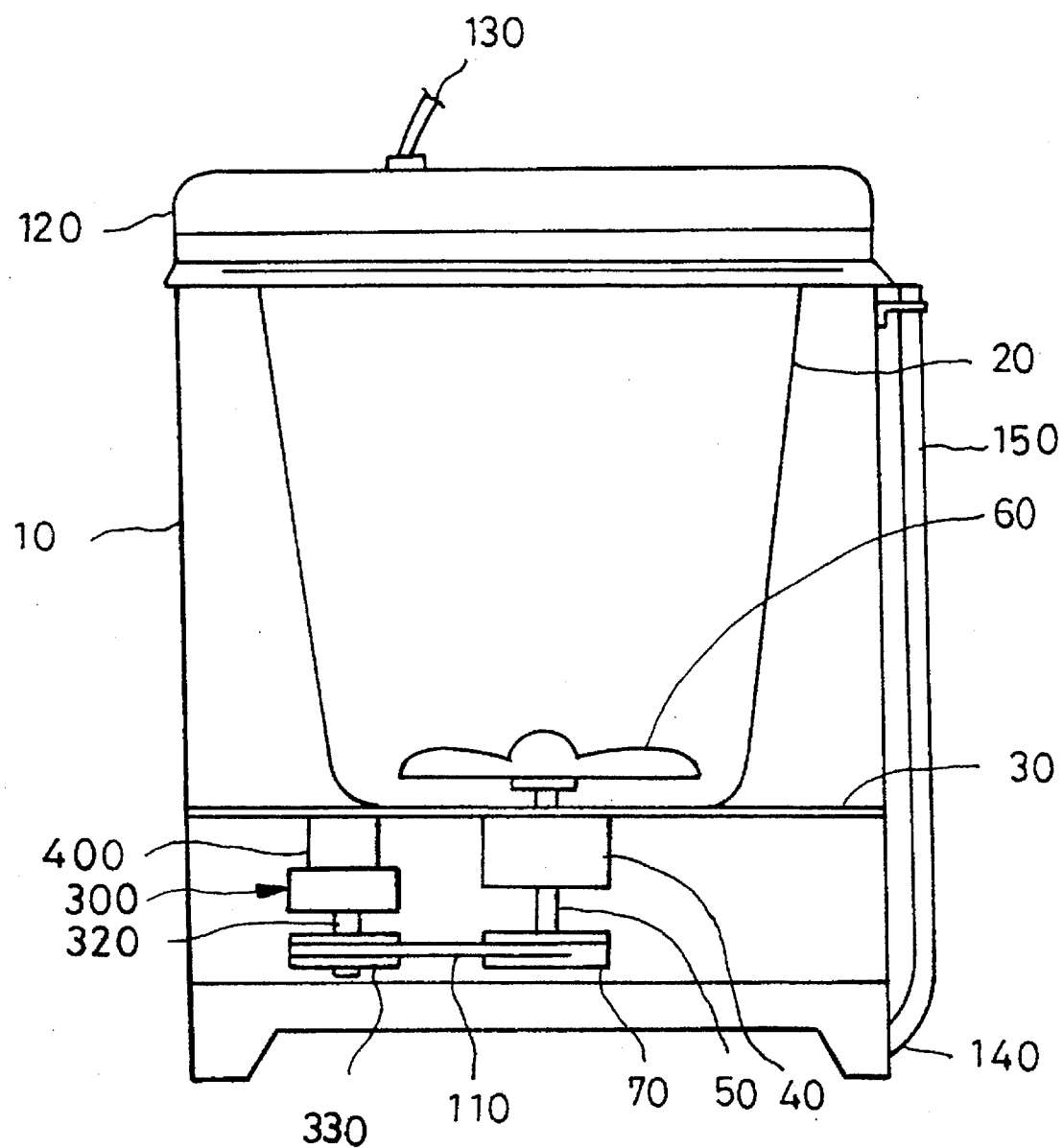
FIG. 2 is a sectional view showing a construction of a washing machine provided with a motor speed detecting device in accordance with a primary embodiment of the invention.

With reference to FIG. 2, there is shown a washing machine having a motor speed detecting device in accordance with a primary embodiment of the invention. In the drawing, the reference numeral 20 denotes a washing tub placed in a washer housing 10, which tub 20 will contain therein washing water together with laundry to be washed. Horizontally placed inside the housing 10 under the washing tub 20 is a support plate 30 for supporting the washing tub 20. The edge of the support plate 30 is fixed to the interior surface of the housing 10. A clutch unit 40 having a clutch shaft 50 is mounted to the bottom surface of the support plate 30. The top section of the clutch shaft 50, which shaft 50 penetrates the clutch unit 40, in turn penetrates a shaft hole 50' of the center of the support plate 30 and extends into the interior of the washing tub 20 to a predetermined length. In order to agitate the laundry in the washing tub 20 during washing operation, an agitator 60 is coupled to the top end of the clutch shaft 50 in the washing tub 20. Meanwhile, the bottom end of the clutch shaft 50 is provided with a clutch pulley 70.

Exteriorly provided on the bottom surface of the support plate 30 beside the clutch unit 40 is a drive motor unit 300 for generating rotating force, which force will be transmitted to the agitator 60 so as to rotate the agitator 60. In accordance with the invention, a motor speed detecting unit 400 for detecting the rotative speed of the motor unit 300 is placed on the motor unit 300. In the drawing, the reference numeral 320 denotes an output shaft of the motor 300.

The top of the housing 10 is covered with a top cover 120, which cover 120 has a size sufficiently covering the top of the washing tub 20. In order to supply water for the washing tub 20, a water supply unit 130 is provided on the top section of the housing 10. The washing machine further includes a drain unit 140 for draining water from the washing tub 20 after washing operation, which drain unit 140 is provided in a lower side section of the housing 10 and has a predetermined length of drain hose 150.

Figure 3:
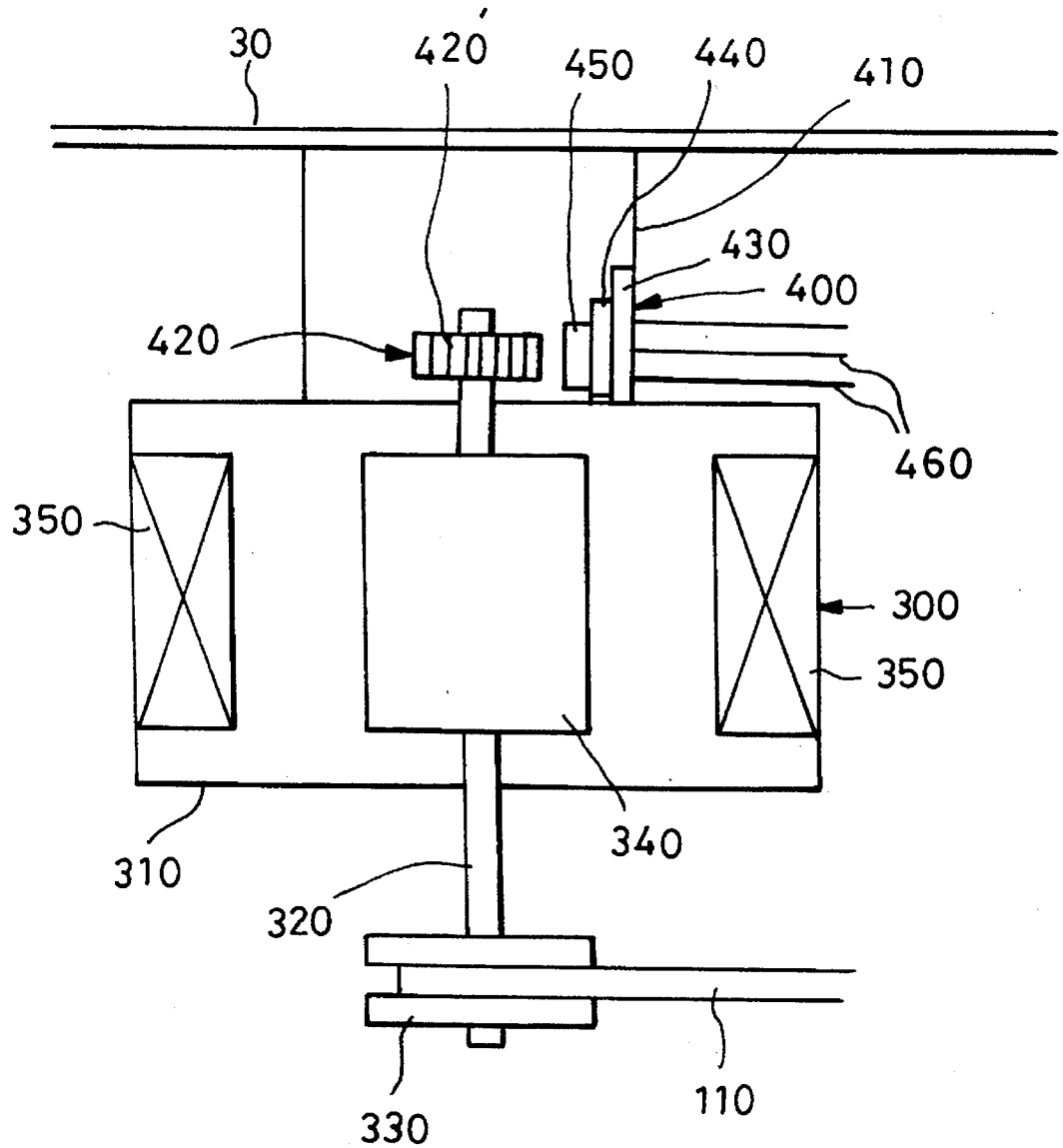
FIG. 3 is an enlarged sectional view showing a drive motor unit and a motor speed detecting unit of the motor speed detecting device of FIG. 2.

Turning to FIG. 3, there is shown the drive motor unit 300 and the motor speed detecting unit 400 in more detail.

As shown in this drawing, the motor unit 300 is cased by a motor casing 310, which casing 310 holds the elements of the motor unit 300 as well as protects the elements from external impact. The motor shaft 320 penetrates the motor casing 310, so that the top end of the motor shaft 320 extends upward from the top of the motor casing 310 to a predetermined length. Meanwhile, the bottom end of the shaft 320 extends downward from the motor casing 320 to a predetermined length and has a motor pulley 330. The motor pulley 330 is connected to and cooperates with the clutch pulley 70 by means of a V-belt 110. In the motor casing 310, a rotor 340 for generating the rotating force is tightly fitted over a middle section of the motor shaft 320. In order to electromagnetically cooperate with the rotor 340 and to generate the rotating force, a plurality of regularly spaced stators 350 are interiorly fixed to the side wall of the motor casing 310.

Meanwhile, the motor speed detecting unit 400 for detecting the rotative speed of the motor unit 300 is placed on the top of the motor unit 300. The unit 400 is cased by a detecting unit casing 410, which casing 410 holds the elements of the detecting unit 400 as well as protects the elements of the unit 400 from external impact. The top surface of the casing 410 is fixed to the bottom surface of the support plate 30, while the bottom surface of the casing 410 is fixed to the top surface of the motor casing 310. In the unit casing 410, a gear type detecting member 420 is mounted to the top end of the motor shaft 320, which detecting member 420 having a predetermined thickness as well as a predetermined diameter is externally threaded so as to form a plurality of threads 420' on its circumferential surface. In addition, a rectangular base plate 430 is interiorly mounted to the side wall of the unit casing 410, so that the base plate 430 is opposed to the detecting member 420 with an interval between the plate 430 and the member 420. Mounted to the front surface of the base plate 430 is a magnet 440 for generating magnetic line of force. The magnet 440 in turn holds a Hall effect linear sensor 450 on its front surface, so that the sensor 450 is opposed to the detecting member 420 with an interval between the sensor 450 and the member 420. The back surface of the base plate 430 is provided with a plurality of input and output terminals 460, which terminals 460 in turn are coupled to a microcomputer (not shown) of a controller of the washing machine.

Hereinbelow, the operational effect of the above motor speed detecting device will be described.

When the motor unit 300 is applied with electric power, the motor shaft 320 along with the rotor 340 is rotated by electromagnetic action between the rotor 340 and the stators 350, so that the gear type detecting member 420 mounted to the top end of the motor shaft 320 is rotated at the same time of rotation of the shaft 320. At this time, the magnet 440 mounted on the base plate 430 emits the magnetic line of force forward, so that the magnetic line of force is scanned on the threads 420' of the rotated member 420. As the detecting member 420 along with the threads 420' is rotated in this case, the magnetic line of force scanned on the threads 420' is changed in density of line of magnetic force. The change of density of line of magnetic force caused by rotation of the detecting member 420 is sensed by the Hall effect linear sensor 450. Upon sensing the change of density of line of magnetic force, the sensor 450 converts the density change into a signal and outputs the signal to the microcomputer through the output terminals 460 of the base plate 430. The microcomputer thus detects the motor speed by the input signal applied from the sensor 450. The microcomputer generates control signals in response to the input signal and outputs the control signals to respective control units of the washing machine.

Figure 4:
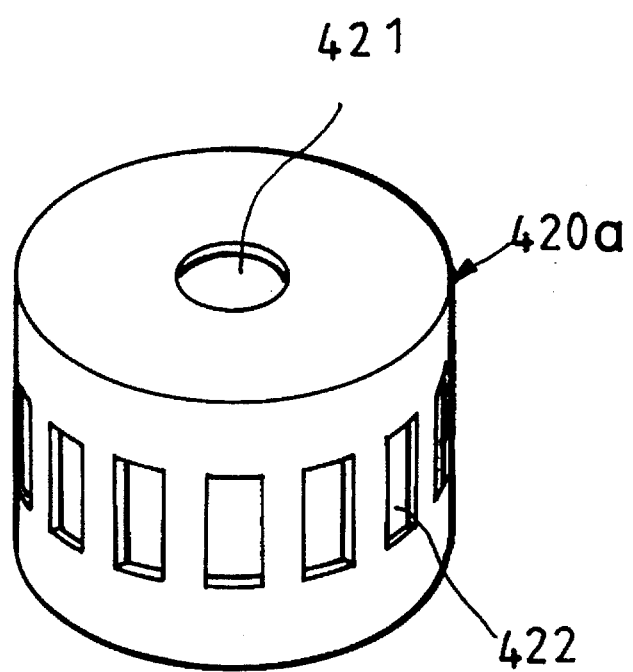
FIG. 4 is a perspective view showing a construction of a motor speed detecting unit in accordance with a second embodiment of the invention.

FIG. 4 is a perspective view showing a construction of a motor speed detecting unit in accordance with a second embodiment of the invention.

As shown in this drawing, the detecting unit 420a of the second embodiment is a hollow cylindrical body whose top and bottom are covered with top and bottom walls. Each of the top and bottom walls of the unit 420a is provided with a predetermined diameter of motor shaft hole 421 for receiving the motor shaft 320 therein. In addition, the side wall of the detecting member 420a is provided with a plurality of regularly spaced rectangular holes 422, each of which holes 422 has a predetermined length and a predetermined width. The detecting unit 420a of the second embodiment yields the same result as that described for the primary embodiment without affecting the functioning of the invention.

As described above, a motor speed detecting device for an automatic washing machine of the invention precisely detects a motor speed of the washing machine and differently controls the motor speed in accordance with different kinds of laundry. Therefore, the device lets the washing machine effectively wash the different kinds of laundry in accordance with different washing modes agreeable to intrinsic characteristics of the different kinds of laundry, thus to improve washing effect of the washing machine. Another advantage of the device is resided in that the device has such simple structure that the device can be readily produced through mass production with low cost.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A device for detecting motor speed of an automatic washing machine comprising:

a housing;

a washing tub placed in said housing;

a support plate for supporting said washing tub in said housing, said support plate being horizontally placed under the washing tub in the interior of the housing;

a motor unit exteriorly provided on the bottom surface of said support plate, said motor unit cased by a motor casing, said motor unit having a motor shaft extending exteriorly of said motor casing; and a motor speed detecting unit for detecting rotative speed of the motor unit, said detecting unit being interposed between said support plate and said motor unit, and encased by a detecting unit casing and including:

a gear shaped detecting member mounted to a top end of said motor shaft exteriorly of said motor casing, said detecting member having a predetermined thickness and a predetermined diameter;

a rectangular base plate interiorly mounted to a side wall of said detecting unit casing;

a magnet for generating a magnetic flux and scanning the magnetic flux on said detecting member, said magnet being mounted to said base plate; and a Hall effect linear sensor for sensing change of density of the magnetic flux, said sensor being mounted to said magnet.

2. The motor speed detecting device according to claim 1, wherein a top surface of said detecting unit casing is mounted to the bottom surface of said support plate, while a bottom surface of said detecting unit casing is mounted to a top surface of said motor casing.

3. The motor speed detecting device according to claim 1, wherein said gear shaped detecting member is provided with a predetermined number of threads on its circumferential surface.

4. The motor speed detecting device according to claim 1, wherein said gear shaped detecting member is a hollow cylindrical body having a plurality of rectangular holes on its side wall, each of said holes having a predetermined length and a predetermined width.

* * * * *